United States Patent
Buchleitner et al.

(10) Patent No.: US 9,297,451 B2
(45) Date of Patent: Mar. 29, 2016

(54) TOOTHED WHEEL ARRANGEMENT AND METHOD FOR PRODUCING A BAYONET FASTENING

(75) Inventors: Helmut Buchleitner, Seewalchen (AT); Karl Dickinger, Vorchdorf (AT); Alexander Mueller, Altmuenster (AT); Wolfgang Siessl, Traunkirchen (AT)

(73) Assignee: Miba Sinter Austria GmbH, Laakirchen (AT)

( * ) Notice: Subject to any disclaimer, the term of this patent is extended or adjusted under 35 U.S.C. 154(b) by 525 days.

(21) Appl. No.: 13/823,898

(22) PCT Filed: Sep. 27, 2011

(86) PCT No.: PCT/AT2011/050014
§ 371 (c)(1),
(2), (4) Date: Mar. 29, 2013

(87) PCT Pub. No.: WO2012/040762
PCT Pub. Date: Apr. 5, 2012

(65) Prior Publication Data
US 2013/0213168 A1   Aug. 22, 2013

(30) Foreign Application Priority Data
Sep. 29, 2010   (AT) ................................ A 1625/2010

(51) Int. Cl.
*F16H 55/17*   (2006.01)
*F16H 55/18*   (2006.01)
*B22F 5/08*   (2006.01)

(52) U.S. Cl.
CPC  *F16H 55/17* (2013.01); *B22F 5/08* (2013.01); *F16H 55/18* (2013.01); *Y10T 74/19916* (2015.01)

(58) Field of Classification Search
CPC .... F16H 55/17; F16H 55/18; Y10T 74/19916
See application file for complete search history.

(56) References Cited

U.S. PATENT DOCUMENTS 4,189,951 A * 2/1980 Sauter .................... F16H 55/18
29/893.33
4,273,995 A * 6/1981 Devanney ............. G06M 1/163
235/139 R (Continued)

FOREIGN PATENT DOCUMENTS

AT          506 961         1/2010
CN       100594314 C        3/2010

(Continued)

OTHER PUBLICATIONS

International Search Report of PCT/AT2011/050014, date of mailing Mar. 13, 2012.

*Primary Examiner* — David M Fenstermacher
(74) *Attorney, Agent, or Firm* — Collard & Roe, P.C.

(57) ABSTRACT

The invention relates to a toothed wheel arrangement (1) comprising a main toothed wheel (2) and a toothed wheel (4) that can be rotated relative thereto in the circumferential direction (3), wherein the main toothed wheel (2) comprises a toothed wheel body (25) on which a hub (5) is arranged in a projecting manner in the axial direction so as, firstly, to accommodate a shaft and, secondly, to arrange the rotatable toothed wheel (4) thereon, for which purpose the rotatable toothed wheel (4) has a cutout (17) coaxial to an axially extending center axis of the main toothed wheel (2), and wherein the main toothed wheel (2) is connected to the rotatable toothed wheel (4) by means of a bayonet fastening (14). The bayonet fastening (14) is formed between the hub (5) and the rotatable toothed wheel (2) and/or between the hub (5) and a spring element (9) bearing on the rotatable toothed wheel (4).

13 Claims, 6 Drawing Sheets

(56) References Cited

U.S. PATENT DOCUMENTS

| | | | |
|---|---|---|---|
| 4,640,147 A * | 2/1987 | Yasukawa | F16H 55/18 74/409 |
| 4,745,823 A * | 5/1988 | Morita | F16H 55/18 74/409 |
| 5,113,713 A * | 5/1992 | Isabelle | F16F 15/124 74/410 |
| 5,492,029 A * | 2/1996 | Obrist | B23H 7/26 219/69.15 |
| 5,606,890 A * | 3/1997 | Luckas | F16D 3/68 464/89 |
| 5,813,335 A * | 9/1998 | Burke | B41F 13/012 101/177 |
| 5,819,588 A * | 10/1998 | Deane | F16H 57/12 74/409 |
| 5,870,928 A * | 2/1999 | Genter | F16H 55/18 74/409 |
| 5,934,144 A * | 8/1999 | Marinkovic | F16H 55/18 74/411 |
| 6,148,684 A * | 11/2000 | Gardiner | B41F 13/012 101/216 |
| 6,661,986 B2 * | 12/2003 | Kitayama | G03G 15/757 399/167 |
| 6,826,975 B2 * | 12/2004 | Reguzzi | F16H 55/12 474/162 |
| 8,387,480 B2 * | 3/2013 | Park | F16H 55/18 74/409 |
| 2008/0141811 A1 | 6/2008 | Sandner | |
| 2010/0242649 A1 | 9/2010 | Vandewal et al. | |

FOREIGN PATENT DOCUMENTS

| | | |
|---|---|---|
| DE | 10 2005 041 357 | 4/2006 |
| GB | 2 360 825 | 10/2001 |
| JP | 8-159242 | 6/1996 |
| WO | WO 2005/090830 | 9/2005 |
| WO | WO 2008/142131 | 11/2008 |

* cited by examiner

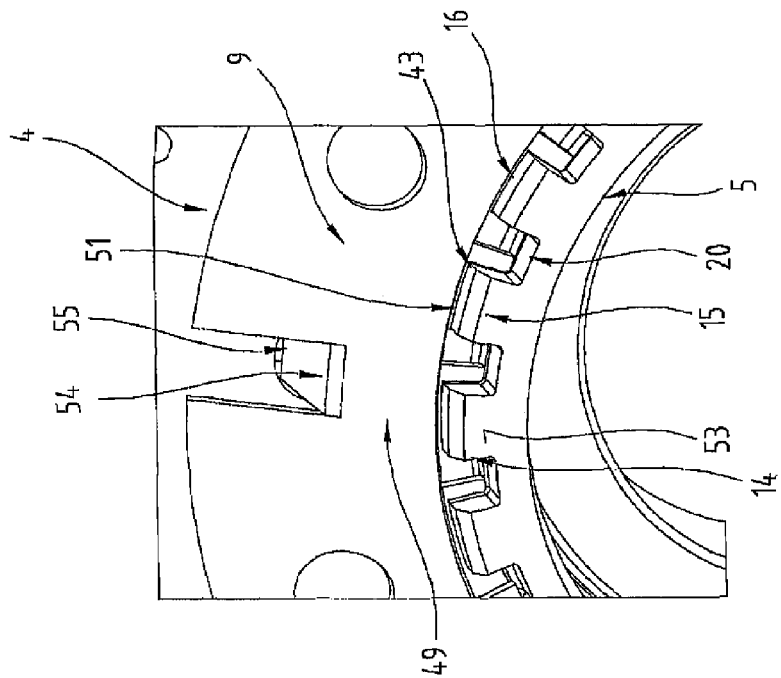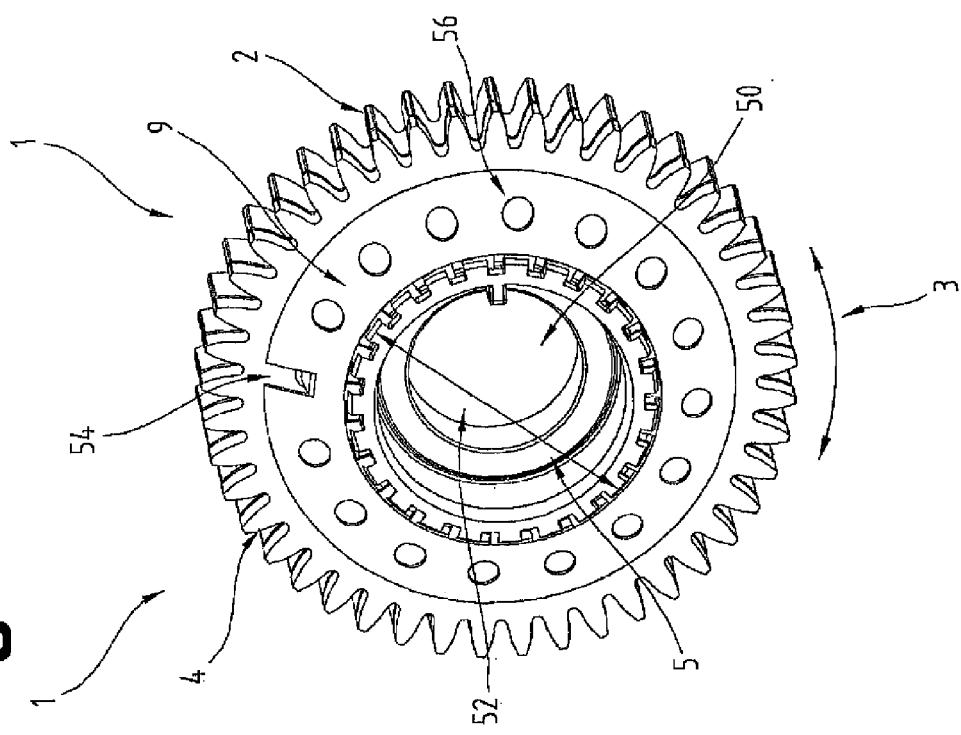

TOOTHED WHEEL ARRANGEMENT AND METHOD FOR PRODUCING A BAYONET FASTENING

CROSS REFERENCE TO RELATED APPLICATIONS

This application is the National Stage of PCT/AT2011/050014 filed on Sep. 27, 2011, which claims priority under 35 U.S.C. §119 of Austrian Application No. A 1625/2010 filed on Sep. 29, 2010, the disclosure of which is incorporated by reference. The international application under PCT article 21(2) was not published in English.

The invention relates to a toothed wheel arrangement comprising a main toothed wheel and a toothed wheel rotatable relative to the latter in circumferential direction, wherein the main toothed wheel comprises a toothed wheel body, on which projecting in axial direction a hub is arranged on the one hand for mounting a shaft and on the other hand for the arrangement of the rotatable toothed wheel, for which reason the rotatable toothed wheel comprises a cut-out coaxial to an axially running central axis of the main toothed wheel, and wherein the main toothed wheel is connected to the rotatable toothed wheel by means of a bayonet fastening, as well as a method for the production of a bayonet fastening for a toothed wheel arrangement comprising a main toothed wheel and a toothed wheel rotatable relative thereto in circumferential direction, wherein the main toothed wheel has a toothed wheel body, on which projecting in axial direction a hub is arranged on the one hand for mounting a shaft and on the other hand for the arrangement of the rotatable toothed wheel, for which reason the rotatable toothed wheel has a cut-out coaxial to an axially running central axis of the main toothed wheel.

A toothed wheel arrangement of this kind is known for example from WO 2005/090830 A1 of the same applicant, which has a toothed wheel for a play-free spur gear stage with a hub, with a gear rim supported by the hub, which is divided along an axially normal dividing plane into two part rims, namely into a rim part secured to the hub and a rim ring mounted rotatably coaxially relative to the latter, and with an annular spring surrounding the hub, which is supported at its ends opposite one another in circumferential direction on support webs formed in one piece with the two part rims overlapping one another in axial direction, which support webs are arranged behind one another in the circumferential direction of the toothed rim. The support web of a part rim passes through the other part rim in a through opening with play in circumferential direction and the support web of the part rim with the through opening forms a mounting stop delimiting the through opening for the other support web. The rim ring is secured axially onto the hub for example by means of a snap ring.

Likewise from WO 2008/142131 A2 a toothed wheel arrangement of this kind is known which comprises two gear wheels, wherein one is arranged to be rotatable relative to the other within specific limits. The two toothed wheels are coupled to one another by a spring element. The spring element is configured in this case in one piece with one of the toothed wheels. In order to secure the axial position of the two toothed wheels relative to one another after adjusting the position of the teeth relative to one another a bayonet fastening can be provided.

The objective of the present invention is to improve a toothed wheel arrangement of the aforementioned type with respect to the connection of the two toothed wheels with one another. It is also a partial objective of the invention to provide an improved method for producing the toothed wheel arrangement.

Said objective of the invention is achieved by the aforementioned toothed wheel arrangement, in which the bayonet fastening is formed between the hub and the rotatable toothed wheel and/or between the hub and a spring element bearing on the rotatable toothed wheel.

The objective is also achieved by the aforementioned method, which comprises the steps:

sintering a one-piece preform for the main toothed wheel from the toothed wheel body and the hub, wherein on the circumference of the hub starting from an end face of the hub, cut-outs are formed running in axial direction to the toothed wheel body, which cut-outs extend up to a cut-out end wall opposite the end face of the hub in axial direction, and which each have two side walls and a base surface, wherein at least one of the side walls forms an angle with the base surface of the cut-out, which is greater than 90°;

machining the hub in circumferential direction, whereby the cut-out end walls are removed and partly undercuts are formed, whereby hub projections are formed which form a part of the bayonet fastening.

By way of the formation of the bayonet fastening between the hub, which mounts the shaft, on which the toothed wheel arrangement is arranged, and the rotatable toothed wheel, it is achieved that different from the prior art, an additional hub on the main toothed wheel is not necessary, whereby the structure of the toothed wheel arrangement can be simplified and improved with respect to the distribution of forces between the main toothed wheel and the rotatable toothed wheel rotatable during the operation of the toothed wheel arrangement. In addition, in this way the assembly of the toothed wheel arrangement is simpler, as there is no need for additional axial securing for securing the relative position of the two toothed wheels in axial direction.

By means of the formation of the bayonet fastening between the spring element and the hub also the rotatable toothed wheel is secured axially, i.e. in that in this way the relative position of the rotatable toothed wheel can be fixed in axial direction of the toothed wheel arrangement, whereby additional connecting elements are not necessary for connecting the rotatable toothed wheel with the main toothed wheel. By means of the arrangement of the bayonet fastening in connection with this configuration of the bayonet fastening it is also possible to have a larger bearing surface between the fastening elements of the bayonet fastening, i.e. e.g. between "finger elements" or tongues of the spring element and the fastening elements of the hub, whereby there is a smaller amount of wear to the bayonet fastening, in particular the spring element, or the whole toothed wheel arrangement. Because of the geometric requirements, determined by the necessity of pushing through and inserting the tongues of the spring element into the corresponding groove in the hub, according to the prior art, as described for example in AT 506 961 B1 of the same Applicant, currently only eight fingers can be formed, which results in a corresponding smaller bearing surface. By replacing the mounting groove with a bayonet fastening a larger number of finger elements can be provided.

Preferably, the main toothed wheel is produced by sintering. To form the fastening elements, in particular the hub projections, as part of the bayonet fastening in this way a subsequent machining process is necessary, in order to form the "groove" between the fastening elements and the toothed wheel body of the main toothed wheel. For preparing the fastening elements the main toothed wheel on the hub is produced with cut-outs in the area of the circumference of the hub, which in the finished main toothed wheel form the intermediate spaces between the fastening elements in circumferential direction, which enable the pushing through of corresponding projections on the rotatable toothed wheel for forming the bayonet fastening. During the subsequent post-machining the machining tool enters these areas also partly to form "openings" (by removing the cut-out end walls) so that the machining tool passes several times—viewed over the circumference of the hub—into the material of the hub. In this case the method according to the invention has the advantage that by the formation of an obtuse angle between the side walls and the base surfaces of the cut-outs—as viewed in circumferential direction—better protection of the processing tool when re-entering the material is achieved, so that the lifetime of the tool can be extended. In addition in this way there is a reduced chance of forming a ridge in the area of machining of the main toothed wheel.

To form the bayonet fastening radially outwards projecting hub projections can be arranged on the hub. In this way it is possible to produce the bayonet fastening in a relatively simple manner, which in particular can also be performed after sintering. Said radially outwards projecting hub projections can be configured to have a relatively large area with respect to their cross-sectional area—as viewed in axial direction of the toothed wheel arrangement—whereby improved wearing behavior can be achieved by the presence of a large bearing surface of the fastening elements of the bayonet fastening of the rotatable toothed wheel on the fastening elements of the bayonet fastening of the main toothed wheel, i.e. the hub projections.

According to one embodiment variant the hub projections are arranged distributed symmetrically over the circumference of the hub, so that the bearing surfaces of the rotatable toothed wheel are arranged on the main toothed wheel distributed evenly over the circumference of the main toothed wheel, and in this way the effective forces can be distributed evenly over the entire circumference of the toothed wheel arrangement. In this way the wearing behavior can be influenced positively.

In axial direction an undercut can be formed between the hub projections and the toothed wheel body in the direction of the circumference of the hub, whereby the security of the fastening of the bayonet fastening can be improved.

Preferably, the undercut extends continuously over the circumference of the hub, in order to simplify the assembly of the toothed wheel arrangement, as in this way the rotatable toothed wheel can be pushed onto both sides of the hub projections onto the hub.

With regard to reducing the wear of the toothed wheel arrangement it is an advantage if the hub projections in circumferential direction of the hub have a total length, which is between 20%, in particular 40%, preferably 50%, and 80%, in particular 60%, of the length of the circumference of the hub.

Preferably, the hub projections as viewed in axial direction, i.e. in plan view of the plane surface, have a trapezoidal cross section. The assembly of the toothed wheel arrangement is simplified in this way. In particular however in this way the production of the bayonet fastening is improved, as already explained above, so that the wear of the machining tools is reduced.

It is also possible that for the formation of the bayonet fastening in the cut-out of the rotatable toothed wheel and/or in a cut-out of the spring element radially inwardly projecting projections are formed, as with this embodiment the sintering production of the rotatable toothed wheel can be simplified, in that the molds can be configured more simply.

Preferably, the spring element and/or the rotatable toothed wheel has/have an anti-twist lock in order to fix the relative position of these two elements of the toothed wheel arrangement to one another. The term "at least almost fixed" means that movements are possible to a maximum of +/−1° in circumferential direction of the spring element.

Said anti-twist lock can be formed by at least one tab, which engages in a cut-out of the rotatable toothed wheel, or according to a further embodiment variant by at least one projection on the spring element and/or on the rotatable toothed wheel. In this way an inexpensive embodiment of the anti-twist lock is possible thus simplifying the assembly of the toothed wheel arrangement.

To simplify the assembly of the toothed wheel arrangement a transition between one end face of the hub and the circumferential surface in the area of the hub projection is configured to be rounded or beveled, as in this way the pushing of the rotatable toothed wheel onto the hub of the main toothed wheel can be simplified.

According to one embodiment variant of the method the angle between the at least one side surface and the base surface is selected from a range with a lower limit of 95°, in particular 100°, and an upper limit of 130°, in particular 120°. With regard to protecting the tools and to the machining speed angles from this range have proved to be particularly advantageous in practice.

It can also be the case that at least individual edges, preferably all of the edges, of the cut-outs are rounded or beveled, whereby a further improvement can be achieved with regard to the lifetime of the tool, in that in particular in the area where the tool enters the material of the main toothed wheel the angle of the cut-out surfaces to the tool for this area is more obtuse, whereby however at the same time this more obtuse angle is only limited to the edge area, so that the material removal speed is not reduced. In addition in this way, by means of the side surfaces of the cut-outs arranged compared to the edge area at a smaller angle to the base surface, the bearing surface of the rotatable toothed wheel on the main toothed wheel in the assembled state of the toothed wheel arrangement is not reduced so far that the advantages of the even loading of the bayonet fastening would be worsened over the circumference of the hub.

Preferably, the rotatable toothed wheel is also produced by sintering, whereby radially inwards running projections are formed in the cut-out of the toothed wheel. It is thus possible to produce the rotatable toothed wheel without much post-processing, wherein also complex bayonet geometries can be formed, without the rotatable toothed wheel having to be subjecting to a post-machining process.

To improve the bearing of the rotatable toothed wheel on the main toothed wheel it is possible that on a radially running end face of the rotatable toothed wheel an annular web is formed.

For a better understanding of the invention the latter is explained in more detail with reference to the following figures.

In a much simplified representation:

FIG. 8 shows a further embodiment variant of a toothed wheel group according to the invention in oblique view;

FIG. 9 shows a detail of the toothed wheel arrangement according to FIG. 8;

Figure 1:
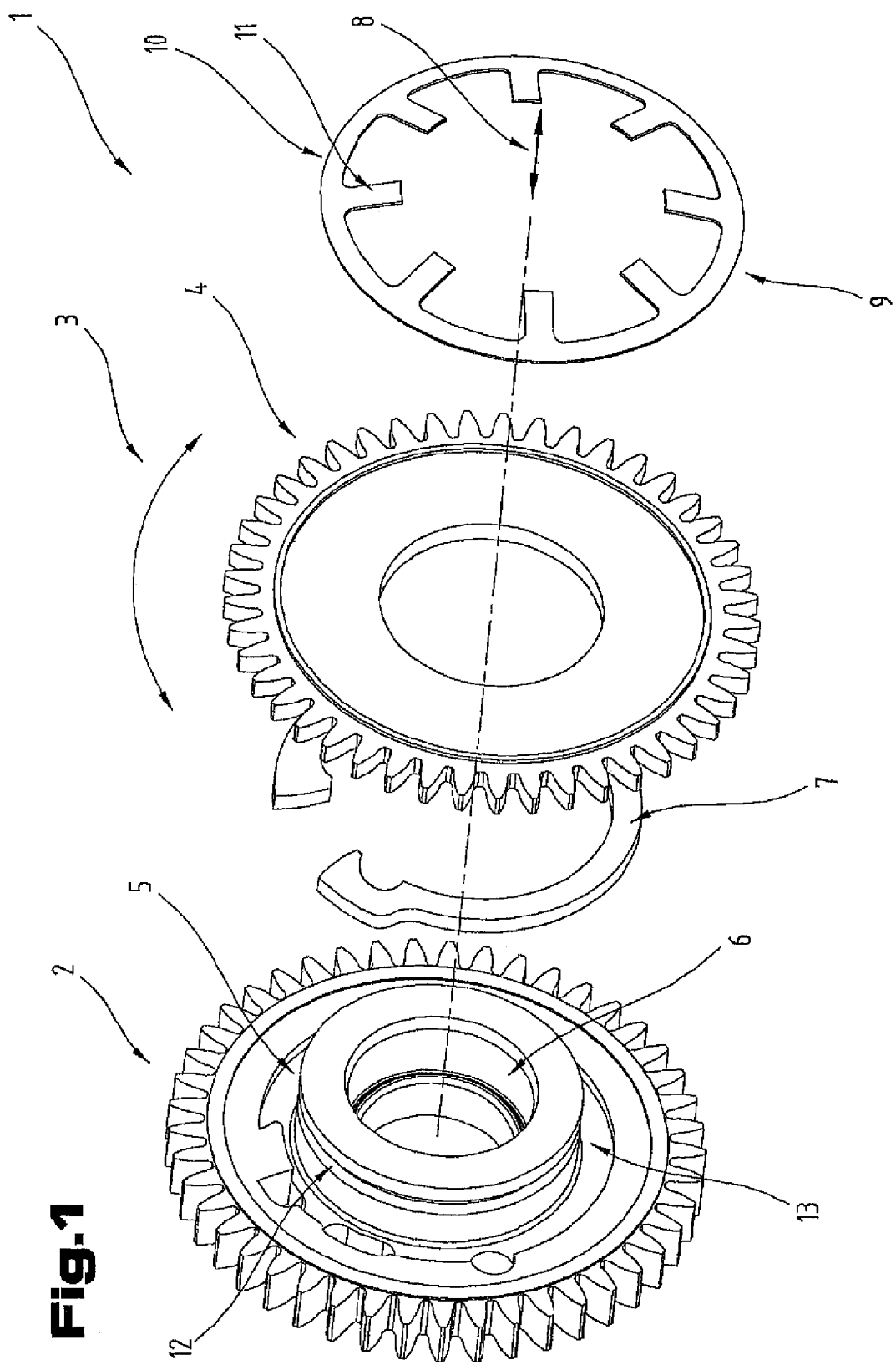
FIG. 1 shows a toothed wheel group according to the prior art in an exploded view.
Figure 3:
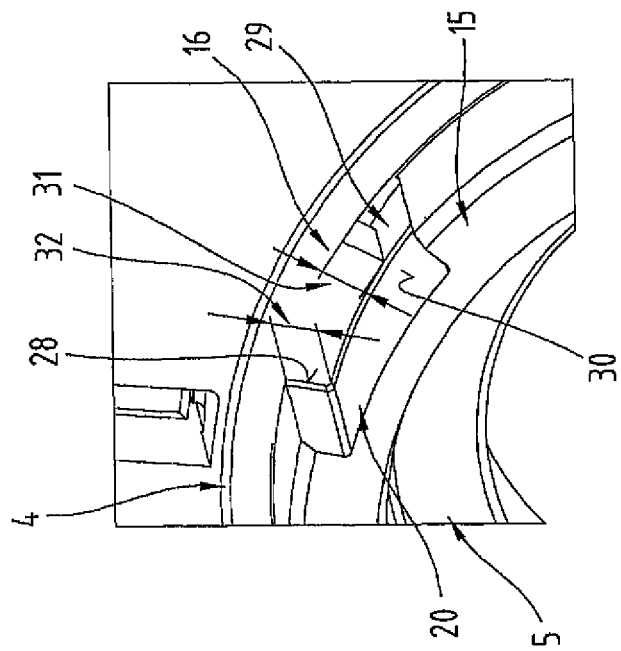
FIG. 3 shows a detail of the toothed wheel arrangement according to FIG. 2.

First of all, it should be noted that in the variously described embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows in exploded view a toothed wheel arrangement 1 known from the prior art. Said toothed wheel arrangement 1, also referred to as a "split-gear", comprises a main toothed wheel 2 and a toothed wheel 4 rotatable relative thereto in circumferential direction 3, wherein the main toothed wheel 2 comprises a hub 5, which in particular is formed in one piece with the main toothed wheel 2. The rotatable toothed wheel 4 is arranged rotatably on the hub 5 of the main toothed wheel 2. The hub 5 comprises a cut-out 6 in the form of a bore for mounting a not shown shaft.

The rotatable toothed wheel 4 is pretensioned by means of a spring element 7, which in this case is in the form of a so-called Ω-spring, in circumferential direction 3 relative to the main toothed wheel 2, as described in WO 2005/090830 A1, which is thus associated in this case of the main structure of the toothed wheel arrangement 1 with the contents of the present description. For the pretensioning, as already described, a support web is formed which forms a mounting stop for an additional support web. The spring element 7 bears on said support webs with both its open end sections.

In order to pretension the additional rotatable toothed wheel 4 in axial direction 8 against the main toothed wheel an additional spring element 9 is arranged, which in this embodiment variant has the form of a disc spring, in particular a disc spring that is slotted in the broadest sense. This additional spring element 9 comprises an outer ring 10, from which obliquely radially inwardly pointing tongues 11, so-called spring tongues, protrude. Said tongues 11 are mounted by a circumferential groove 12 which is formed in an end section 13 of the hub 5. By means of the spring tensioning in this way the additional rotatable toothed wheel 4 is pretensioned in axial direction relative to the main toothed wheel.

FIGS. 2 to 7 show a first embodiment variant of the toothed wheel arrangement 1 according to the invention.

Figure 2:
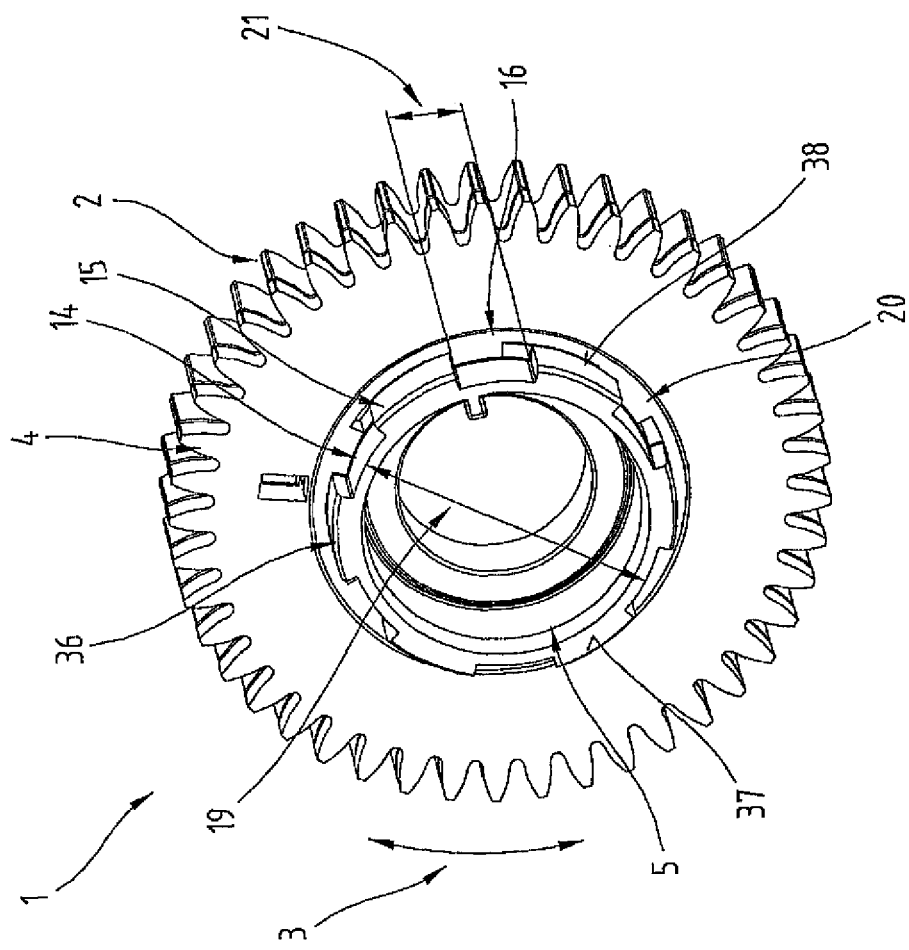
FIG. 2 shows a first embodiment variant of a toothed wheel group according to the invention in oblique view.

FIG. 2 shows in turn the main toothed wheel 2 and the rotatable toothed wheel 4 arranged thereon. The rotatable toothed wheel 4 is arranged in this way on the hub 5. This embodiment variant of the toothed wheel arrangement also has the advantage that the additional spring element 9 of the embodiment according to FIG. 1 for axially securing the rotatable toothed wheel 4 is not necessary.

Although this is not shown, in this and in all of the further embodiment variants of the invention the pretensioning force for the rotatable toothed wheel 4 can be produced in circumferential direction 3 by the spring element 7, for example the Ω-spring.

Figure 5:
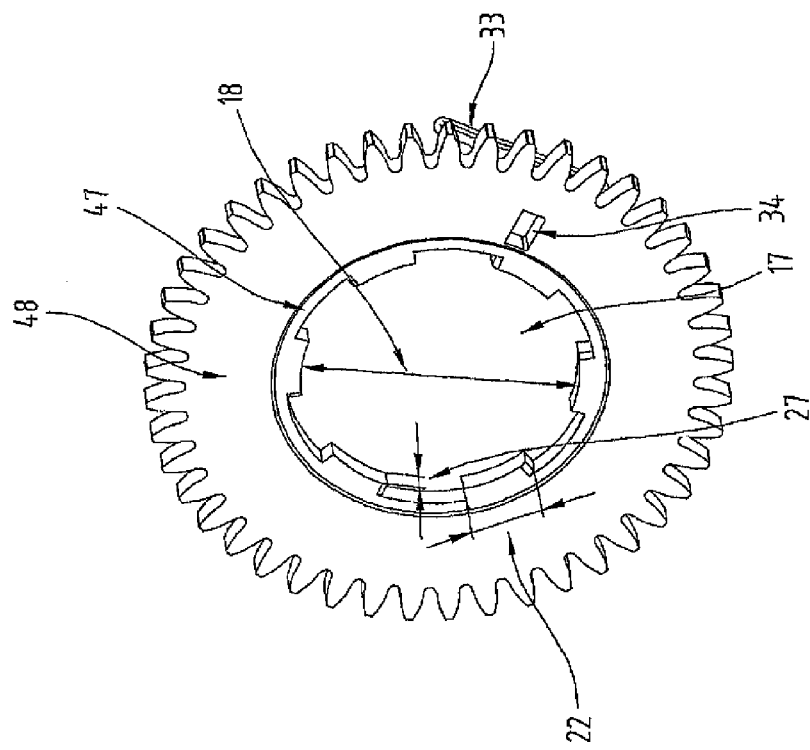
FIG. 5 shows the rotatable toothed wheel of the embodiment variant according to FIG. 2 in oblique view.

For connecting and axially securing the rotatable toothed wheel 4 to the main toothed wheel 2 a bayonet fastening 14 is provided between the hub 5 of the main toothed wheel 2 and the rotatable toothed wheel 4. In addition, as also shown in detail in FIG. 3, the hub 5 comprises radially outwards projecting fastening elements, which in the following are denoted as hub projections 15. The rotatable toothed wheel 4 also comprises projections 16, which are arranged running radially inwards in a cut-out 17 (FIG. 5). The cut-out 17 is formed coaxially to the hub 5 and is used, to push the rotatable toothed wheel 4 onto the hub 5 of the main toothed wheel 2. In addition, an inner diameter 18 between two opposite projections 16, as shown in FIG. 5, has a size which corresponds at least approximately to an outer diameter 19 of the hub in the area between cut-outs 20, where the cut-outs 20 are formed in circumferential direction 3 between two adjacent hub projections 15 on the hub.

The term "at least approximately" in this context means that the inner diameter 18 corresponds at least to the outer diameter 19 with regard to its dimension, but preferably is slightly greater, in order in this way to push the rotatable toothed wheel 4 more easily onto the hub 5.

The cut-outs 20 between two hub projections 15 have a width 21 in circumferential direction 3 which is at least as large as the width 22 (FIG. 5) of the projections 16 on the rotatable toothed wheel 4 in the same direction, so that the projections 16 can be pushed into said cut-outs 20. Preferably, width 21 is slightly greater than width 22. It is also preferable if the cut-outs 20 in axial direction of the toothed wheel arrangement 1 have a cross section which corresponds approximately to the cross section in the same direction of the projections 16 of the rotatable toothed wheel 4.

Figure 4:
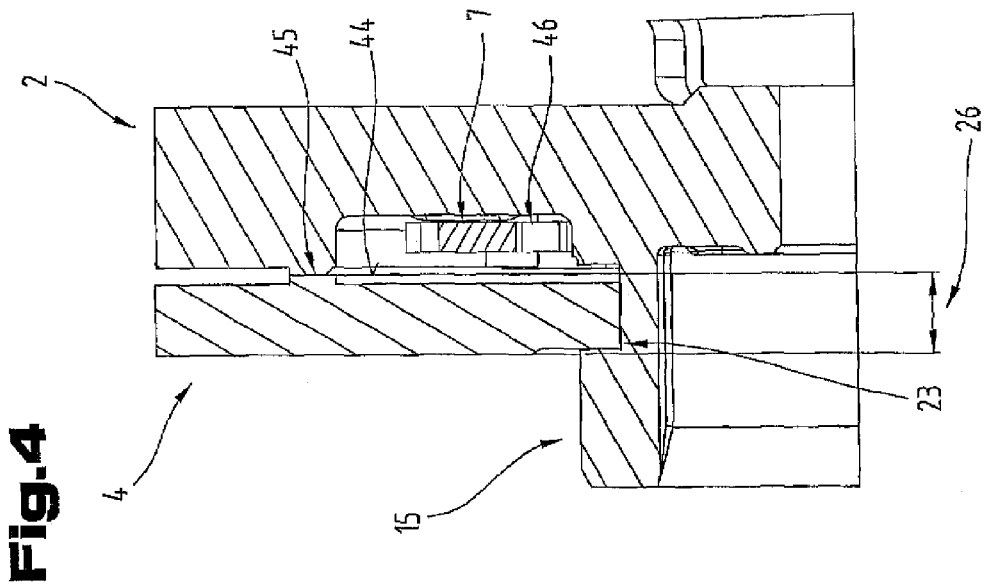
FIG. 4 shows a detail of the toothed wheel arrangement according to FIG. 2 in side view.
Figure 7:
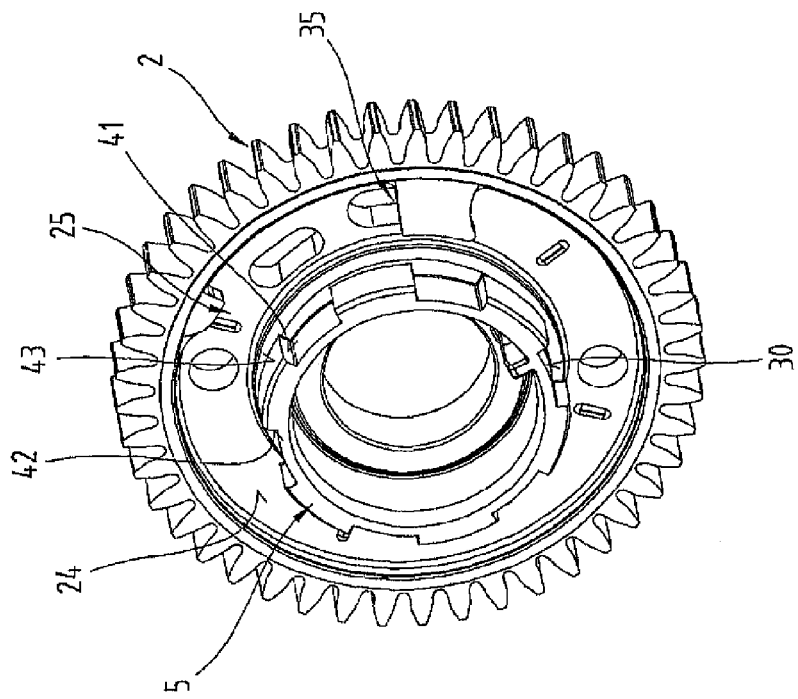
FIG. 7 shows the main toothed wheel according to FIG. 6 in oblique view after machine processing.
Figure 6:
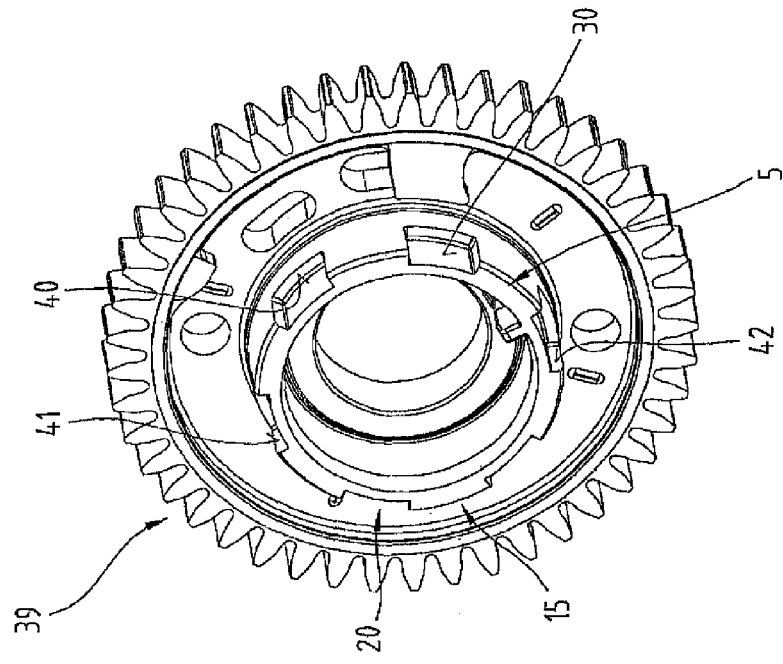
FIG. 6 shows a preform of the main toothed wheel of the embodiment variant according to FIG. 2 in an oblique view.

Behind the hub projections 15 in axial direction of the toothed wheel arrangement 1 an undercut 23 is made in the form of a groove, as shown in particular in FIG. 4. The hub projections 15 are thus arranged spaced apart in axial direction from an end face 24 (FIG. 7) of a toothed wheel body 25 of the main toothed wheel 2—the main toothed wheel 2 consists of the toothed wheel body 25 and the hub 5. A width 26 of the undercut 23 or the groove is thus preferably selected so that it has a size, which corresponds at least approximately to a width 27 (FIG. 5) in axial direction of the projections 16 of the rotatable toothed wheel 4, wherein the term "at least approximately" means that the width 26 of the undercut 23 is selected so that the rotatable toothed wheel 4 can be rotated in circumferential direction 3.

In the preferred embodiment an end face 28 (FIG. 3) of the hub projections 15 pointing in the direction of the toothed wheel body 25 of the main toothed wheel 2 is aligned to be coplanar to the direction of the end face 24 of the toothed wheel body 25 pointing to the hub projections 15, so that the undercut 23 in circumferential direction 3 of the toothed wheel arrangement has a rectangular or quadratic cross section. However, it is also possible that said end face 28 is arranged at a slanting angle to the end face 24 of the toothed wheel body 25, so that the undercuts 23 narrow in circumferential direction. On the one hand this achieves greater pressing of the rotatable toothed wheel 4 on the main toothed wheel 2 in a specific position and on the other hand also the rotatability of the rotatable toothed wheel 4 can be limited in this way.

The restriction of the rotatability of the rotatable toothed wheel 4 in circumferential direction 3 of the toothed wheel arrangement 1 can also be achieved in that the undercut 23 is not continuous in circumferential direction 3, so that the hub projections 15 are arranged only partly spaced apart from the end face 24 of the toothed wheel body 25 of the main toothed wheel 2. Preferably, the undercut 23 is configured to be continuous in circumferential direction 3, so that an annular groove is formed, which in the area of the cut-outs 20 in axial direction is open to the front. In this case a groove base 29 (FIG. 3) is preferably formed in the same plane as a base surface 30 of the cut-outs 20. However, it is also possible that the groove base 29 in radial direction is set down against said base surface, for example is deeper, in order to form a "lubricant groove". The groove base 29 can however be higher in radial direction from the longitudinal middle axis by the toothed wheel arrangement 1 than the base surfaces 30 of the cut-outs 20, where in this case the projections 16 of the rotatable toothed wheel 4 have to be adjusted accordingly, i.e. in that a height 31 of the projections 16 in radial direction is smaller than a height 32 of the hub projections 15, where the difference is obtained from the height difference in radial direction between the groove base 29 and the base surface 30.

For the assembly of the toothed wheel arrangement 1 the rotatable toothed wheel 4 is fitted onto the hub 5, wherein the projections 16 of the rotatable toothed wheel 4 in axial direction are positioned aligned with the cut-outs 20 of the hub 5, then the rotatable toothed wheel 4 in axial direction is pushed in the direction of the toothed wheel body 25 of the main toothed wheel 2 and if the projections 16 of the rotatable toothed wheel 4 in axial direction lie behind the hub projection 15, rotated in circumferential direction 3 against the main toothed wheel, whereby by means of the projections 16 and the hub projections 15 the bayonet fastening 14 is produced for the axial securing of the rotatable toothed wheel 4 relative to the main toothed wheel 2. If necessary the spring element 7 can be arranged between the rotatable toothed wheel 4 and the main toothed wheel 2. In order to ensure the relative position in this bearing position, in which the teeth of the rotatable toothed wheel 4 are aligned with the teeth of the main toothed wheel 2 at least approximately in axial direction, a securing element 33 is pushed through the two toothed wheels, for which reason the rotatable toothed wheel 4 and the main toothed wheel 2 each have a cut-out 34 or 35 in the form of an opening. After the installation of the toothed wheel arrangement 1 said securing element 33 is removed again.

It should be noted at this point that, although in FIGS. 2 to 5 six hub projections 15 and six projections 16 and accordingly six cut-outs 20 are shown, within the scope of the invention a different number of hub projections 15, projections 16 and cut-outs 20 can be provided, for example three, four, five, seven, eight etc., or selected from a range with a lower limit of three and an upper limit of 30, as explained in the following in more detail by way of an embodiment variant of the toothed wheel arrangement 1 without the projections 16.

Preferably, the hub projections 15 of the main toothed wheel 2 and the projections 16 of the rotatable toothed wheel 4 are arranged symmetrically over the circumference of the hub 5 or the cut-out 17 of the rotatable toothed wheel 4, i.e. the spacings between the hub projections 15 or projections 16 are of equal size, as shown in FIGS. 2 to 5.

However, it is also possible to arrange said hub projections 15 asymmetrically, whereby the assembly of the rotatable toothed wheel 4 on the main toothed wheel 2 can be simplified.

However, it is an advantage if the hub projections 15 in the direction of the circumference of the hub 5 have a total length, which is between 20%, in particular 40%, preferably 50%, and 80%, in particular 60%, of the length of the circumference of the hub 5. In this case the length of the circumference of the hub 5 is measured in the height of the base surface 30 of the cut-outs 20—as viewed in radial direction.

According to another embodiment variant at least the transitions 36 between an end face 37 of the hub projections 15 pointing to the front in axial direction and a circumferential surface 38 in the radially upper area of the hub projections 15 are rounded or beveled. In particular however, all of the transitions between the end face der hub 5 pointing axially outwards and the circumferential surface of the hub 5 can be rounded or beveled, i.e. also the transitions in the area of the base surfaces 30 of the cut-outs 20 (it should be noted that the hub projections 15 are preferably formed in one piece with the hub, so that the circumferential surfaces 38 of the hub projections 15 form a part of the total circumference of the hub 5).

The main toothed wheel 2 is preferably produced in one piece by a sintering method, i.e. the hub 5 and the toothed wheel body 25 do not consist of two separate parts. In addition, with a powder, in particular a steel powder, a preform 39 is produced, as shown for example in FIG. 6, by way of the usual steps, such as powder mixing, powder pressing in a mold, sintering, possibly post-compacting and/or calibrating. Said preform 39 differs from the finished toothed wheel only in that the undercut 23 or the (annular) groove between the thus not finished hub projections 15 and the toothed wheel body 25 is not yet formed, as shown in a comparison of FIGS. 6 and 7. Said undercut 23 is produced according to a sintering method in a machining step using a tool, for example a chisel or by milling. As the preform already has cut-outs 20 between the unfinished hub projections 15 and cut-out end walls 40 of the cut-outs 20 are removed during the machining, the tool enters into the material of the hub 5 several times during the entire processing. In this way greater wear of the tool and increased ridge formation are associated by the interrupted step in the machining area. In order to improve or alleviate these problems according to the method of the invention at least the side walls 41 of the cut-outs 20, which at the same time are the side walls 41 of the hub projections 15, into which during the machining the tool from the area of the cut-outs 20 enters the material of the hub 5, is aligned at least partly at an angle to the base surface 30, which is greater than 90°. In other words the hub projections 15 as viewed in axial direction have at least partly a trapezoidal cross section.

The term "at least partly trapezoidal" means that the cross section of the hub projections 15 can also be composed of several geometric shapes, for example the cross section consists of a rectangle with a trapezium on top.

In addition to forming the cross section at least partly in the shape of a right-angled trapezium the preferred option is that also a second side wall 42 of the cut-outs 20 or the hub projections 15, which if formed in circumferential direction following the first side wall 41, is inclined relative to the base surface 30, at an angle which is greater than 90°. It is particularly preferable to have embodiments of the cross section, which is symmetrical, i.e. the two at least partly inclined side surface 41, 42 form the same angle with the base surface 30, so that the cross section of the hub projections 15 in axial direction is at least partly, preferably completely, an isosceles trapezium.

The angle formed by at least one of the side surfaces 41, 42 and the base surface 30 is preferably selected from a range with a lower limit of 95°, in particular 100°, and an upper limit of 130°, in particular 120°.

Preferably, at least individual, in particular all, of the edges or transitions in the area of the hub projections 15 in circumferential direction 3, i.e. the transitions or edges between the base surface 30 and the side walls 41, 42 and/or between the side walls 41, 42 and a cover wall 43 are rounded or beveled.

It is not necessary within the scope of the invention for the projections 16 of the rotatable toothed wheel 4 to have a cross section which follows the contour of the cut-outs 30 of the hub 5, although this is the preferred embodiment variant of the toothed wheel arrangement 1.

According to a further embodiment variant of the toothed wheel arrangement 1, at one end face 44 of the rotatable toothed wheel 4 an annular web 45 is formed, over which the rotatable toothed wheel 2 bears on the toothed wheel body 25 of the main toothed wheel 2, as shown in FIG. 4. On the one hand in this way by means of the smaller bearing surface of the rotatable toothed wheel 4 on the main toothed wheel 2 the rotatability of the rotatable toothed wheel 4 is simplified, on the other hand in this way between the rotatable toothed wheel 4 and the main toothed wheel 2 a cut-out 46 is created in the form of an annular groove for mounting the spring element 7 between the rotatable toothed wheel 4 and the main toothed wheel 2. Said cut-out 46 can however also be formed at least partly by a corresponding shaping in the toothed wheel body 25 of the main toothed wheel 2.

Said annular web 45 can however also be arranged on the toothed wheel body 25 of the main toothed wheel 2 or it is possible that both the rotatable toothed wheel 4 and the main toothed wheel 2 have an annular web 45 of this kind.

In addition, it is possible that in the area, on which the annular web 45 bears on the main toothed wheel 2, in the latter an annular groove is arranged for mounting the annular web 45, in order in this way to achieve a better guiding of the rotatable toothed wheel 4 on the main toothed wheel 2 during the rotation.

It is also possible that the rotatable toothed wheel 4 is formed in an area 47 of the bearing of the projections 16 on the hub projections 15 to be recessed, so that the projections 16 are not in one plane with a main body 48 of the rotatable toothed wheel 4 above the area 47, as shown in FIG. 5, in order in this way to improve the configuration of the bayonet fastening between the two toothed wheels.

FIGS. 8 and 9 show an embodiment variant of the toothed wheel arrangement 1 in oblique view or detailed view with the main toothed wheel 2, the rotatable toothed wheel 4 bearing thereon and the spring element 9, in particular a disc spring.

The bayonet fastening 14 in this embodiment variant of the toothed wheel arrangement 1 is formed between the hub 5 and the spring element 9 used for axial fastening. In addition the hub 5 comprises the radially outwards projecting hub projections 15. To form the bayonet fastening 14 also projections 16 are provided which are arranged unlike the preceding embodiment variant on the spring element 9 and are arranged by a spring element body 49 projecting radially inwards in a cut-out 50 of the spring element 9. The cut-out 50 is dimensioned, i.e. in diameter, so that the spring element 9 can be pushed onto the hub 5, which is why there are projections 16 on the spring element 9, as in the preceding embodiment variant the projections 16 are pushed through the cut-outs 20 between the hub projections 15.

Unlike the preceding embodiment variant of the bayonet fastening 14 behind the hub projections 15 there is not annular groove for mounting the projections 16 of the spring element 9, but the cover walls 43 or cover surfaces are configured to be angled, so that—as viewed in circumferential direction 3 of the toothed wheel arrangement 1—the hub projections in the area of the cover walls 43 have an at least approximately triangular cross section. In this case an edge-like central elevation 51 is dimensioned so that a circle following the central elevations of all hub projections 15 has a diameter 52, which is greater than a smallest inner diameter of the spring element 9, which is defined by the end sections of the tongue-like projections 16 of the spring element 9. In axial direction and in the direction of the main toothed wheel 2 the diameter defined by those of the hub projections 15 is smaller—compared to the diameter defined by the edge-shaped central elevations 51—so that the projections 16 of the spring element can be pushed onto the cover walls 43 of the hub projections 15, as shown in detail in FIG. 9.

The central elevations 51 of the hub projections 15 need not necessarily be edge-shaped. For example, these central elevations 51 can also be flattened, whereby with respect to the cross section of the hub projections 15 in the area of cover walls 43 a step-like run is provided. It is possible that the central elevations 15 run up to an outer end face 53 of the hub projections 15.

Of course, it is also possible with this embodiment variant of the bayonet fastening 14 to provide the undercut 23 described in relation to FIGS. 2 to 7 for mounting the projections 16 of the spring element 9. However, the first embodiment variant has the advantage of showing the more inexpensive production of the hub projections 15, as the latter can be preformed in a sintering process and the subsequent amount of material to be taken off during the machining of the main toothed wheel 2, if necessary, is less than with the production of an annular groove.

These embodiment variants have the advantage that a spring element 9 can be used which has more than eight tongues (in this case the projections 16), as already described above.

Preferably, the spring element 9 is provided with an anti-twist lock 54, which in the shown embodiment variant is configured as a tab, which is bent in the direction of the rotatable toothed wheel 4 and is mounted in a cut-out 55 of the rotatable toothed wheel 4.

It is also possible however to form the anti-twist lock by at least one projection on the spring element 9 and/or on the rotatable toothed wheel 2, which engages in a corresponding cut-out of the respective other element, for example in, in particular circular, cut-outs 56 of the spring element 9, as shown in FIG. 8.

Figure 10:
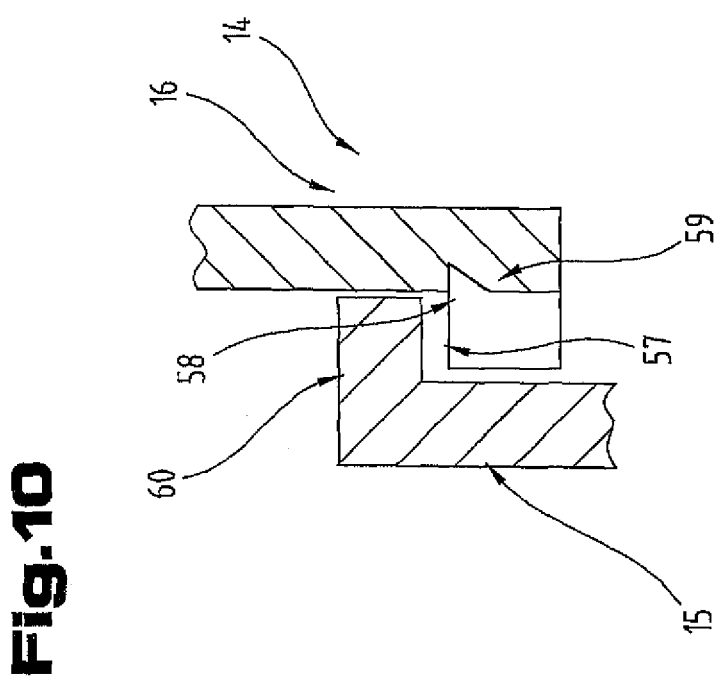
FIG. 10 shows a detail of an embodiment variant of a bayonet fastening in cross section.

FIG. 10 shows an embodiment variant of a bayonet fastening 14. Unlike the embodiment variants described above the hub projections 15 and the projections 16 of the rotatable toothed wheel 4 (not shown) in cross section—as viewed in circumferential direction 3 (e.g. FIG. 8)—are each provided with an undercut 57, 58, so that the hub projections 15 and the projections 16 of the rotatable toothed wheel 4 are configured to be angled and the angles 59 of the projections 16 of the rotatable toothed wheel 4 engage below angles 60 of the hub projections 15. The angles 59, 60 run at least almost in axial direction of the toothed wheel arrangement 1.

Within the scope of the invention mixed variations of the shown embodiments are also possible, for example in that a bayonet fastening 14 is formed both between the rotatable toothed wheel 4 and the hub 5 and between the spring element 9 and the hub 5.

Lastly, for the sake of completeness it should be noted that the main toothed wheel 2 and the rotatable toothed wheel 4 are preferably made from sintered steel, the additional spring element 9 is made from spring steel.

The exemplary embodiments show possible embodiment variants of the toothed wheel arrangement 1, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Finally, as a point of formality, it should be noted that for a better understanding of the structure of the toothed wheel arrangement 1 the latter and its components have not been represented true to scale in part and/or have been enlarged and/or reduced in size.

The individual embodiments shown in FIGS. 2 to 7, 8 and 9 can form the subject matter of independent solutions according to the invention.

List of Reference Numerals 1 toothed wheel arrangement
2 main toothed wheel
3 circumferential direction
4 toothed wheel
5 hub
6 cut-out
7 spring element
8 direction
9 spring element
10 ring
11 tongue
12 groove
13 end section
14 bayonet fastening
15 hub projection
16 projection
17 cut-out
18 inner diameter
19 outer diameter
20 cut-out
21 width
22 width
23 undercut
24 end face
25 toothed wheel body
26 width
27 width
28 end face
29 groove base
30 base surface
31 height
32 height
33 securing element
34 cut-out
35 cut-out
36 transition
37 end face
38 circumferential surface
39 preform
40 cut-out end wall
41 side wall
42 side wall
43 cover wall
44 end face
45 annular web
46 cut-out
47 area
48 main body
49 spring element body
50 cut-out
51 central elevation
52 diameter
53 end face
54 anti-twist lock
55 cut-out
56 cut-out
57 undercut
58 undercut
59 angle
60 angle

The invention claimed is:

1. A toothed wheel arrangement comprising a main toothed wheel and a toothed wheel rotatable relative to the latter in circumferential direction, wherein the main toothed wheel comprises a toothed wheel body, on which a hub projecting in an axial direction is arranged on the one hand for mounting a shaft and on the other hand for the arrangement of the rotatable toothed wheel, wherein the rotatable toothed wheel has a cut-out coaxial to an axially running central axis of the main toothed wheel, and the main toothed wheel is connected to the rotatable toothed wheel via a bayonet fastening, wherein radially outwards projecting hub projections are arranged on the hub, wherein in the axial direction between the hub projections and the toothed wheel body an undercut is formed in the direction of the circumference of the hub, wherein in the cut-out of the rotatable toothed wheel or in a cut-out of a spring element bearing on the rotatable toothed wheel radially inwards projecting projections are formed and the bayonet fastening is formed between the hub projections of the hub and the projections of the rotatable toothed wheel or between the hub projections of the hub and the projections of the spring element, wherein an inner diameter between two opposite projections has a size which corresponds to an outer diameter of the hub in the area between cut-outs, wherein said cut-outs are formed in a circumferential direction between two adjacent hub projections on the hub, and wherein the undercut extends continuously over the circumference of the hub.

2. The toothed wheel arrangement as claimed in claim 1, wherein the hub projections are arranged distributed symmetrically over the circumference of the hub.

3. The toothed wheel arrangement as claimed in claim 1, wherein the hub projections in the circumferential direction of the hub have a total length which is between 20% and 80% of the length of the circumference of the hub.

4. The toothed wheel arrangement as claimed in claim 1, wherein the hub projections as viewed in the axial direction have at least partly a trapezoidal cross section.

5. The toothed wheel arrangement as claimed in claim 1, wherein at least one of the spring element and the rotatable toothed wheel has an anti-twist lock.

6. The toothed wheel arrangement as claimed in claim 5, wherein the anti-twist lock is formed by at least one tab which engages in a cut-out of the rotatable toothed wheel.

7. The toothed wheel arrangement as claimed in claim 5, wherein the anti-twist lock is formed by at least one projection on the spring element or on the rotatable toothed wheel.

8. The toothed wheel arrangement as claimed in claim 1, wherein a transition is formed between an end face of the hub and the circumferential surface in the area of the hub projections to be rounded or beveled.

9. A method for producing a bayonet fastening for a toothed wheel arrangement comprising a main toothed wheel and a toothed wheel rotatable relative to the latter in a circumferential direction, wherein the main toothed wheel has a toothed wheel body, on which projecting in axial direction a hub is arranged on the one hand for mounting a shaft and on the other hand for the arrangement of the rotatable toothed wheel, wherein the rotatable toothed wheel comprises a cut-out coaxial to an axially running central axis of the main toothed wheel, and wherein it comprises the steps:

sintering a one-piece preform for the main toothed wheel from the toothed wheel body and the hub, wherein on the circumference of the hub starting from an end face of the hub, cut-outs are formed running in an axial direction to the toothed wheel body, which cut-outs extend up to a cut-out end wall opposite the end face of the hub in the axial direction, and which each have two side walls and a base surface, wherein at least one of the side walls forms an angle with the base surface of the cut-out, which is greater than 90°; and machining the hub in the circumferential direction, whereby the cut-out end walls are removed and partly undercuts are formed, whereby hub projections are formed which form a part of the bayonet fastening.

10. The method as claimed in claim 9, wherein the angle between the at least one side wall and the base surfaces is selected from a range with a lower limit of 95° and an upper limit of 130°.

11. The method as claimed in claim 9, wherein at least individual edges of the cut-outs are shaped to be rounded or beveled.

12. The method as claimed in claim 9, wherein the rotatable toothed wheel is also produced by sintering, and wherein radially inwardly running projections are formed in the cut-out of the toothed wheel.

13. The method as claimed in claim 12, wherein on an end face of the rotatable toothed wheel running in radial direction an annular web is formed.

\* \* \* \* \*